United States Patent [19]

Lillibridge et al.

[11] Patent Number: 4,557,412

[45] Date of Patent: Dec. 10, 1985

[54] INTERSECTING FEATHER SEALS AND CONSTRUCTION THEREOF

[75] Inventors: Herbert J. Lillibridge, Plainville; Russell A. Schwarzmann, Marlborough, both of Conn.

[73] Assignee: United Technologies Corporation, Hartford, Conn.

[21] Appl. No.: 632,097

[22] Filed: Jul. 18, 1984

Related U.S. Application Data

[62] Division of Ser. No. 558,401, Dec. 5, 1983, Pat. No. 4,524,980.

[51] Int. Cl.[4] .................... F16J 15/08

[52] U.S. Cl. .................... 228/155

[58] Field of Search .................... 228/170, 155, 135, 136; 403/346, 347

[56] References Cited

U.S. PATENT DOCUMENTS

| | | | |
|---|---|---|---|
| 1,012,761 | 12/1911 | Ulrich | 403/346 X |
| 1,123,847 | 1/1915 | Clark et al. | 403/347 |
| 3,023,998 | 3/1962 | Sanderson | 415/189 X |
| 3,144,255 | 8/1964 | Thorne et al. | 277/199 X |
| 3,728,041 | 4/1973 | Bertelson | 277/199 X |

*Primary Examiner*—Kenneth J. Ramsey
*Attorney, Agent, or Firm*—Norman Friedland

[57] ABSTRACT

A feather seal construction that interlocks a pair of feather seal elements that fit into intersecting slots. Each interlocking element is restrained axially but permits relative limited rotary motion. One of the elements is recessed with diametrically opposed slots forming an "H" shaped member and the other is apertured at one end which is then slotted, bent to allow it to fit into the diametrical slots and then joined in the original position. An extruding end adjacent one face of the interlocking element seals in an axial direction giving both radial and axial sealing characteristics.

3 Claims, 4 Drawing Figures

INTERSECTING FEATHER SEALS AND CONSTRUCTION THEREOF

This is a division of application Ser. No. 558,401 filed on Dec. 5, 1983, now U.S. Pat. No. 4,524,980.

DESCRIPTION

1. Technical Field

This invention relates to seals and particularly to the feather type of seals.

2. Background Art

While in its preferred embodiment this invention is utilized in the stator vane of a gas turbine engine its utility has many applications. Feather seals are customarily utilized on vanes and they extend in slots in the vane's platform so as to seal between vane segments that make up the ring. The purpose of the feather seal is to seal off the fluid working medium from the ambient surrounding that medium and vice versa. For example, such seals are typical in the first stator vanes of the first stage of the high pressure turbine in a twin spool engine. It is also common to fabricate the seal slots so that they intersect each other and several feathers fit into the slots. Examples of such construction can be found in the JT-9D, JT-8D, and PW2037 engine models manufactured by Pratt & Whitney Aircraft of United Technologies Corporation, the assignee of this patent application which is incorporated herein by reference.

This invention is specific to those components that require feather seals that intersect each other.

In accordance with this invention, each of the feather seals are constructed so that they interlock, but yet are rotatable to one another. A portion of the interlocking seal extends beyond the face of the joining seal to afford a seal against leakage in an axial direction of the retaining slot. Fabricating the interlocking seals into a unitary unit facilitates the installation of these seals in what would have otherwise been a complicated installation problem had separate feather seals been utilized. In addition, the utilizing of the inventive seals reduces the number of parts that have to be inventoried, which obviously simplifies the retention of spare parts and reduces costs.

In actual tests, we have found that we were able to reduce seal leakage by substantially 80% over the heretofore used feather seals. This also enhances the designers' ability to fabricate the seals in the most desirable direction to block flow, either radially or axially.

DISCLOSURE OF INVENTION

It is an object to provide for a segmented stator vane of a gas turbine engine on improved feather seal. A feature of the seal is that one or more feather seals are combined to form a unitary unit that has restrained rotary motion but is fixed axially relative to each other.

Another feature of this invention is to fabricate the unitary feather seal by stamping out an "H" shaped section of one flat stock blank, and a rectangular hole in the cooperating flat stock blank near the attaching end. The upper edge is cut forming a tang, that bends outwardly so that the slot is inserted to fit around the interconnecting leg of the "H" shaped section. The tang is then closed and welded into place. This allows each of the feather seals to rotate relative to each other.

Still another feature of this invention is that the upper portion adjacent the slot of the feather seal projects beyond the flat surface of the connecting feather seal and serves as a barrier for the air flowing adjacent said surface.

The invention is characterized as being simple to fabricate, relatively inexpensive and improves the sealing characteristics of the heretofore feather seals.

Other features and advantages will be apparent from the specification and claims and from the accompanying drawings which illustrate an embodiment of the invention.

BEST MODE FOR CARRYING OUT THE INVENTION

Figure 1:
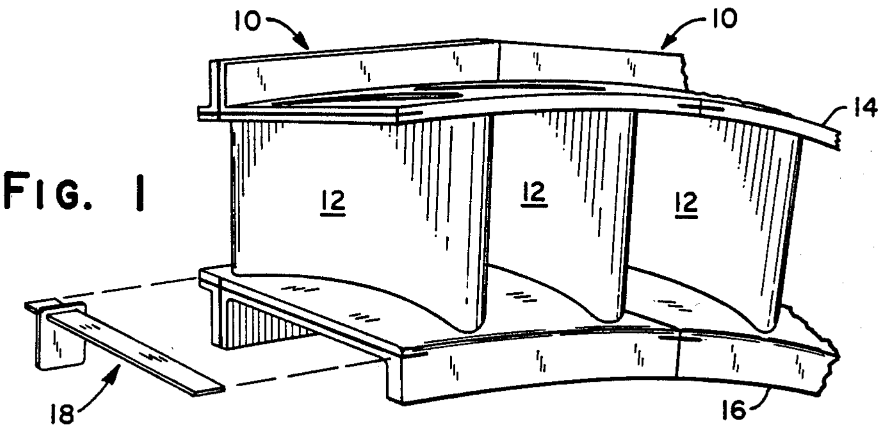
FIG. 1 is a perspective view of a feather seal and segments of a ring of vanes showing the slots for accepting feather seals.

As noted above, this invention is specific to the fabrication of feather seals designed to fit into intersecting slots. While such a condition is prevalent in stator vane construction for turbine type power plants, as one skilled in the art will appreciate the invention has much greater utility and hence, should not be limited to the preferred embodiment. Furthermore, the invention has utility on other parts of the engine.

However, the invention is specific to an interlocking seal as shown in FIGS. 1, 2, 3 and 4. In the preferred embodiment, each segment of a stator vane is generally illustrated by reference numeral 10 comprising the vane or air foils 12 supported between end buttresses 14 and 16. Obviously, a plurality of segments are butted end to end to form a complete ring. To seal between segments, each buttress is slotted as shown for accommodating the feather seal.

To appreciate the significance of this invention, it should be realized that, heretofore, the intersecting slot as shown would require three feather seals. One seal would lie across the intersecting juncture while a pair of feather seals would extend from each face of that seal.

Figure 2:
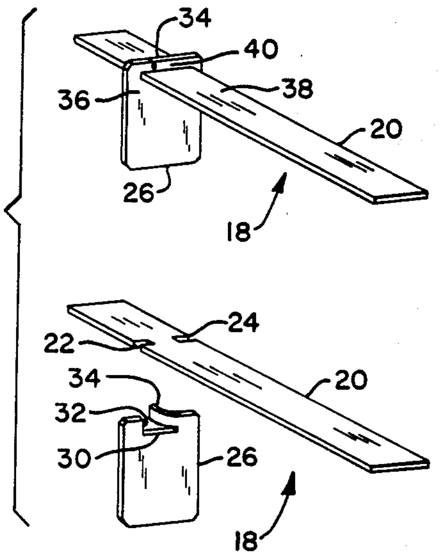
FIG. 2 is a perspective view of the feather seal before and after assembly.
Figure 4:
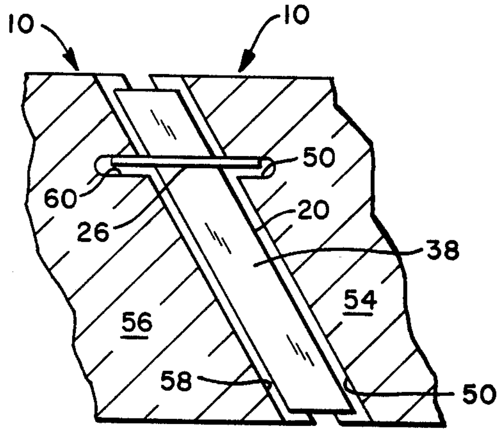
FIG. 4 is a partial sectional view showing the seal mounted between adjacent vane segments.
Figure 3:
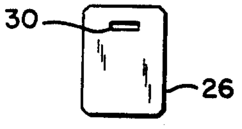
FIG. 3 is a plan view of one element of the unitary feather seal.

In accordance with the invention, the feather seal elements generally illustrated by reference numeral 18 are formed into a unitary unit. One of the intersecting elements 20 is formed from flat sheet metal stock into an "H" shaped member by stamping or cutting out diametrically opposed slots 22 & 24. The complimentary element 26 is likewise formed from flat sheet metal stock and has a rectangular shaped aperture 30 stamped or cut out at one end, as shown, (FIG. 3). The upper end of element 26 is cut along the edge 32 to form an access end to slot 30 and defines tang 34 (FIG. 2). Tang 34 is bent outwardly a distance to allow element 26 to be inserted into recesses 22 & 24 of element 20. Once inserted, tang 34 is returned to its original position and joined, say by spot welding, into its original place.

This construction permits elements 20 and 26 to have a limited rotational movement relative to each other but yet is restrained axially. As noted, the pivot is about an imaginary axis passing through the leg of the "H" shaped element 20 in a place in coincidence with slots 22 and 24. This allows for ease of assembly.

As noted, when in the assembled position, tang 34 aligns with the face 36 to form a wall 40 that extends across the face 38 of element 20. When the feather seal is inserted into its intended slot, leakage flow flows in the slots of the buttresses along the face 38 as well as the other faces of the feather seal elements. The wall 40 extending in the slot forms a barrier to prevent this leakage flow from escaping. This allows the buttress to be fabricated without the necessity of sealing the ends of the slots as been the situation heretofore. This eliminates a very expensive step in the manufacturing of these stator vane segments.

To assemble the unitary feather seal 18, the edge of the feather seal is inserted into the slots 50 and 52 of one of the vane segments 54. And the next adjacent segment 56 is aligned so that its complementary slots 58 and 60 align with the opposite edges of the unitary feather seal 18 and both segments are urged toward each other so that they are in abutting end to end position. This procedure is continued until the entire ring is assembled.

It should be understood that the invention is not limited to the particular embodiments shown and described herein, but that various changes and modifications may be made without departing from the spirit and scope of this novel concept as defined by the following claims.

We claim:

1. The method of fabricating an interlocking feather seal consisting of a pair of flat metallic plate members in angular relationship relative to each other comprising the steps of:

(a) broaching diametrically opposed slots into one of said flat metallic plate members (b) broaching an aperture at one end of the other of said flat metallic plate members (c) cutting a slit in the piece mentioned in the above step to intersect an edge of said aperture (d) bending the end of the piece slit in the above-mentioned step and (e) fitting said aperture into the diametrically opposed slots, joining the bent portion after retaining it to its original position.

2. The method as in claim 1 wherein said joining comprises the step of butt welding.

3. The method as in claim 1 wherein said aperture is rectangular in shape.

* * * * *